United States Patent
Stawski (10) Patent No.: US 9,638,230 B2
(45) Date of Patent: May 2, 2017

(54) COMPOSITE STRUCTURE AND METHOD

(71) Applicant: The Boeing Company, Chicago, IL (US)

(72) Inventor: Stanley W. Stawski, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 137 days.

(21) Appl. No.: 14/930,214

(22) Filed: Nov. 2, 2015

(65) Prior Publication Data

US 2016/0160899 A1 Jun. 9, 2016

Related U.S. Application Data

(62) Division of application No. 13/895,409, filed on May 16, 2013, now Pat. No. 9,205,634.

(51) Int. Cl.
*B64C 1/06* (2006.01)
*F16B 11/00* (2006.01)
(Continued)

(52) U.S. Cl.
CPC .............. *F16B 11/00* (2013.01); *B29C 65/02* (2013.01); *B29C 65/5014* (2013.01); *B29C 65/5042* (2013.01); *B29C 66/00145* (2013.01); *B29C 66/112* (2013.01); *B29C 66/1122* (2013.01); *B29C 66/131* (2013.01); *B29C 66/474* (2013.01); *B29C 66/494* (2013.01); *B29C 66/524* (2013.01); *B29C 66/532* (2013.01); *B29C 66/54* (2013.01); *B29C 66/634* (2013.01); *B29C 66/721* (2013.01); *B29C 66/7375* (2013.01); *B29C 66/81455* (2013.01); *B29C 70/446* (2013.01); *B29C 70/86* (2013.01); *B32B 37/1009* (2013.01); *B29C 65/4835* (2013.01); *B29C 66/71* (2013.01);
(Continued)

(58) Field of Classification Search
CPC ............ Y10T 428/24174; B64C 1/064; B64C 2001/0072
USPC ........................................................ 428/119
See application file for complete search history.

(56) References Cited

U.S. PATENT DOCUMENTS

| 4,798,594 A | 1/1989 | Hillstead |
| 5,710,414 A | 1/1998 | Matsen et al. |

(Continued)

FOREIGN PATENT DOCUMENTS

| EP | 1459873 A2 | 9/2004 |
| EP | 1762357 A1 | 3/2007 |

(Continued)

OTHER PUBLICATIONS

Lukosevicius, M. et al., "Reservoir Computing Approaches to Recurrent Neural Network Training," Aug. 2009, vol. 3, No. 3, Computer Science Review, Elsevier, Amsterdam, The Netherlands, pp. 127-149.

(Continued)

*Primary Examiner* — Alexander Thomas
(74) *Attorney, Agent, or Firm* — Toler Law Group, PC (57) ABSTRACT

A composite part includes a first structural element. The composite part includes a second structural element joined at an intersection with the first structural element to form a fillet. The composite part further includes reinforcement webbing wrapped around the first structural element proximate the fillet.

19 Claims, 5 Drawing Sheets

(51) Int. Cl.
- *B29C 65/50* (2006.01)
- *B29C 65/00* (2006.01)
- *B32B 37/10* (2006.01)
- *B29C 70/44* (2006.01)
- *B29C 70/86* (2006.01)
- *B29C 65/02* (2006.01)
- *B29L 31/30* (2006.01)
- *B29C 65/48* (2006.01)

(52) U.S. Cl.
CPC .... *B29C 66/7212* (2013.01); *B29C 66/72321* (2013.01); *B29C 66/7394* (2013.01); *B29C 66/73752* (2013.01); *B29C 66/73754* (2013.01); *B29C 66/73941* (2013.01); *B29L 2031/3055* (2013.01); *B29L 2031/3067* (2013.01); *B29L 2031/3082* (2013.01); *B29L 2031/3085* (2013.01); *B29L 2031/3088* (2013.01); *B29L 2031/3097* (2013.01); *Y02T 50/433* (2013.01); *Y10T 403/47* (2015.01)

(56) References Cited

U.S. PATENT DOCUMENTS

| | | | |
|---|---|---|---|
| 6,458,309 B1 * | 10/2002 | Allen | B29C 70/446 156/197 |
| 6,849,150 B1 * | 2/2005 | Schmidt | B29C 65/5085 156/285 |
| 8,377,248 B2 | 2/2013 | Coleman et al. | |
| 2010/0080942 A1 | 4/2010 | McCarville et al. | |
| 2010/0151162 A1 | 6/2010 | Dorawa et al. | |

FOREIGN PATENT DOCUMENTS

| | | |
|---|---|---|
| EP | 2052846 A1 | 4/2009 |
| WO | 2004011169 A2 | 2/2004 |
| WO | 2013001458 A2 | 1/2013 |

OTHER PUBLICATIONS

Extended European Search Report for European Application No. 14167906.8 dated Dec. 5, 2014, 7 pgs.

* cited by examiner

COMPOSITE STRUCTURE AND METHOD

CLAIM OF PRIORITY

The present application claims priority from, and is a divisional application of, U.S. patent application Ser. No. 13/895,409, filed May 16, 2013, now U.S. Pat. No. 9,205,634, the contents of which is incorporated by reference herein in its entirety.

FIELD OF THE DISCLOSURE

The subject matter described herein relates to manufacturing techniques and more particularly to techniques to form a T-shaped or I-shaped composite structure which includes an air gap in a region which would normally contain a radius filler.

BACKGROUND

Composite structures are used in various manufacturing and construction operations. By way of example, various structural components of aircraft may be formed from composite materials. Composite materials which are incorporated into structures that from a T-shaped or I-shaped cross section, e.g., beams or flanges, typically form a fillet at the intersection of the structures. In conventional manufacturing techniques these fillets are filled with a compound commonly referred to as a radius filler. In some circumstances the use of radius fillers creates structural issues in completed parts.

Accordingly, composite structures and methods to make the same may find utility, e.g., in the construction of vehicles such as aircraft or watercraft.

SUMMARY

In one example, a method to form a composite part comprises joining a first structural element and a second element to form a fillet at an intersection of the first structural element and the second element, positioning an inflatable radius filler in the fillet, positioning the composite part in a vacuum chamber, venting the inflatable radius filler to an environment external to vacuum chamber, drawing a vacuum in the vacuum chamber, and curing the composite part.

In another example, a composite part comprises a first structural element and a second element formed from a composite material and joined at an intersection to define a fillet at the intersection and an inflatable radius filler positioned in the fillet.

In another example, a composite part comprises a first structural element and a second element formed from a composite material and joined at an intersection to define a fillet at the intersection, and an air radius in the fillet.

BRIEF DESCRIPTION OF THE DRAWINGS

Embodiments of methods and systems in accordance with the teachings of the present disclosure are described in detail below with reference to the following drawings.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

As described herein, composite structures may be assembled into structural components for use in a larger structure such as an aircraft, a space vehicle, or a waterborne vehicle. By way of example, aircraft structures such as wings and tails commonly include structural components formed from composite materials. Embodiments described herein allow composite structures to be assembled into T-shaped or I-shaped components without the use of radius fillers, thereby increasing the efficiency of the manufacturing process and allowing for lightweight, strong composite components.

Figure 1:
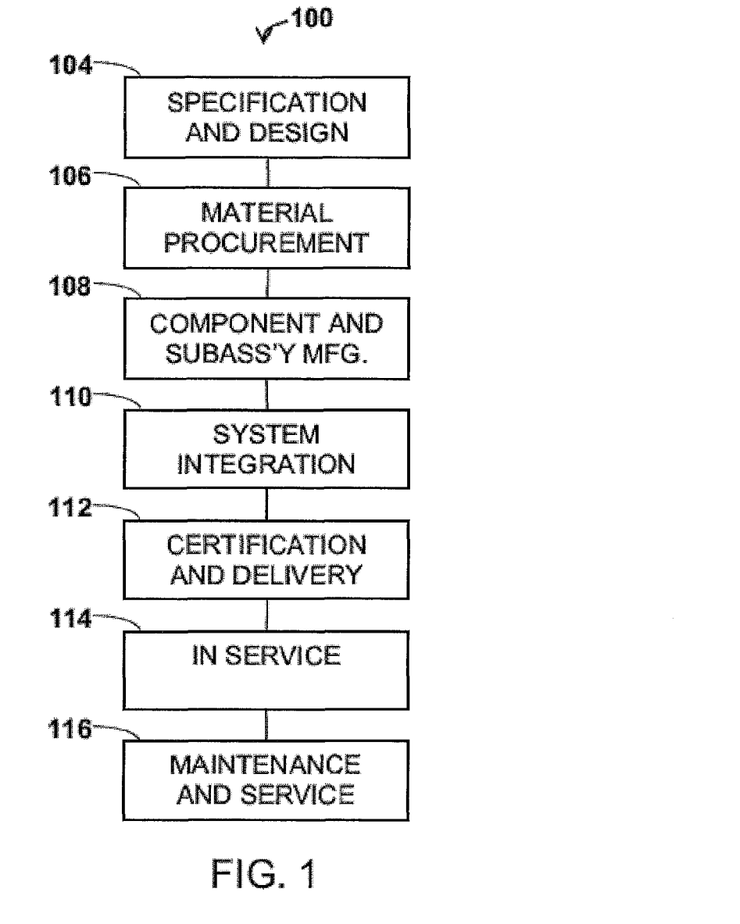
FIG. 1 is a flow diagram of aircraft production and service methodology, according to embodiments.
Figure 2:
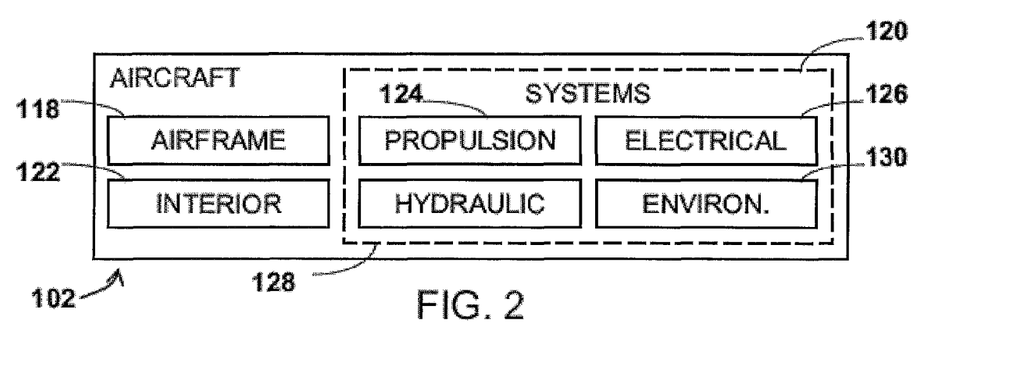
FIG. 2 is a block diagram of an aircraft, according to embodiments.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on. As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

FIGS. 3A-3D are schematic illustrations of composite part 300, according to embodiments. Referring to FIGS. 3A-3D, in some embodiments, a composite part 300 comprises first structural elements 310A and 310B, which may be referred to collectively by reference numeral 310 and second structural elements 320A and 320B, which may be referred to collectively by reference numeral 320.

Figure 3A:
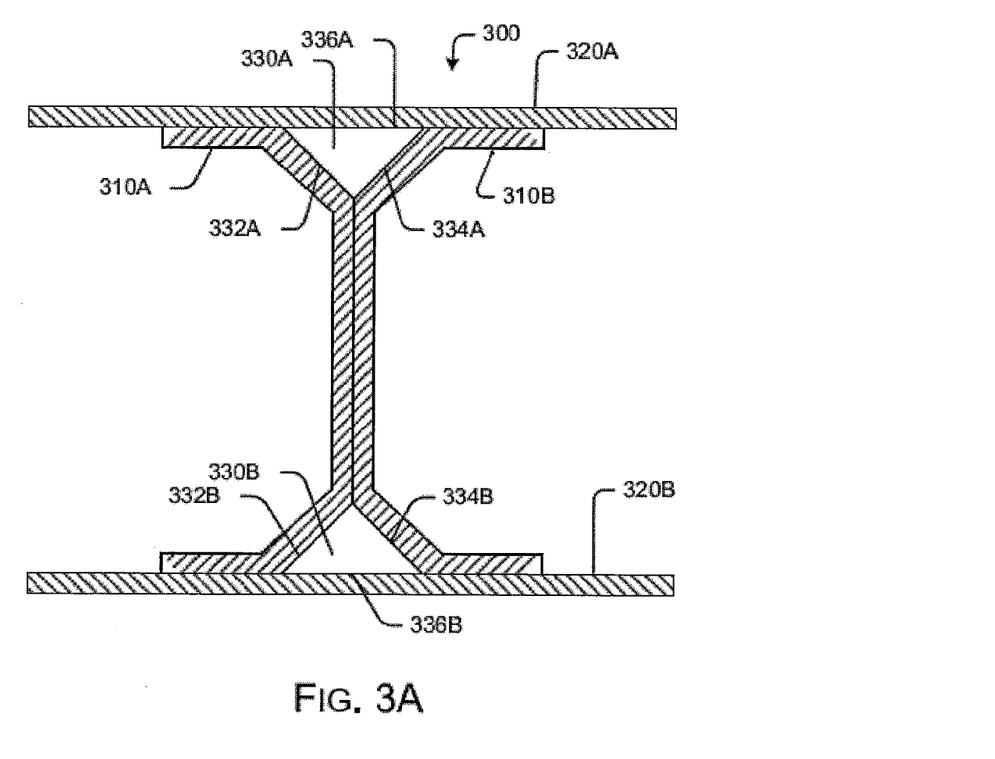
FIG. 3A is a side view of composite structure, according to embodiments.

First structural elements 310 and second structural elements 320 may be formed from a fiber-reinforced composite material such as fiberglass, carbon fiber, Kevlar, or the like bonded by a resin such as an epoxy resin or the like. First structural elements 310 and second structural elements 320 may include one or more layers of a reinforcing metal, e.g., aluminum, titanium, or steel.

In the embodiment depicted in FIG. 3A the first structural elements 310 and second structural elements 320 are joined at an intersections to define fillets 330A and 330B, which may be referred to collectively by reference numeral 330, at the intersections. The first structural elements 310 have a C-shaped cross section and are arranged in opposing orientations such that the fillets 330 are substantially triangular in shape. Fillet 330A has a first side 332A, a second side 334A and a third side 336A. Similarly, fillet 330B has a first side 332B, a second side 334B and a third side 336B. One skilled in the art will recognize that the shape of the fillets 330 is a function of the shape of the first structural elements 310. The side walls 332, 334, 336 may be straight or curved, depending upon the shape of the first structural elements. By way of example, in the embodiment depicted in FIG. 3A, the fillet is in the form of a triangle having corners with angle measurements that are approximately 45°, 45°, and 90°. One skilled in the art will recognize that other measurements may be useful. Further, although the composite part 300 has two second structural elements 320 to present an I-shaped cross section, one skilled in the art will recognize that in some embodiments the first structural elements 310 may be secured to a single second structural element 320 to present a T-shaped cross section.

In various embodiments the composite part 300 may be a structural component of an aircraft. Examples of such components include wing boxes, control surfaces, wings, skins, fuselages, doors, or the like.

As described above, in conventional practice fillets 330 have been filled with a structural material commonly referred to in the art as a radius filler. In some circumstances it may be advantageous to manufacture the composite part 300 without a radius filler disposed in the fillet(s) 330. Techniques to manufacture a composite part 300 without a radius filler will be explained with reference to FIGS. 3A-3C and FIG. 4.

Figure 4:
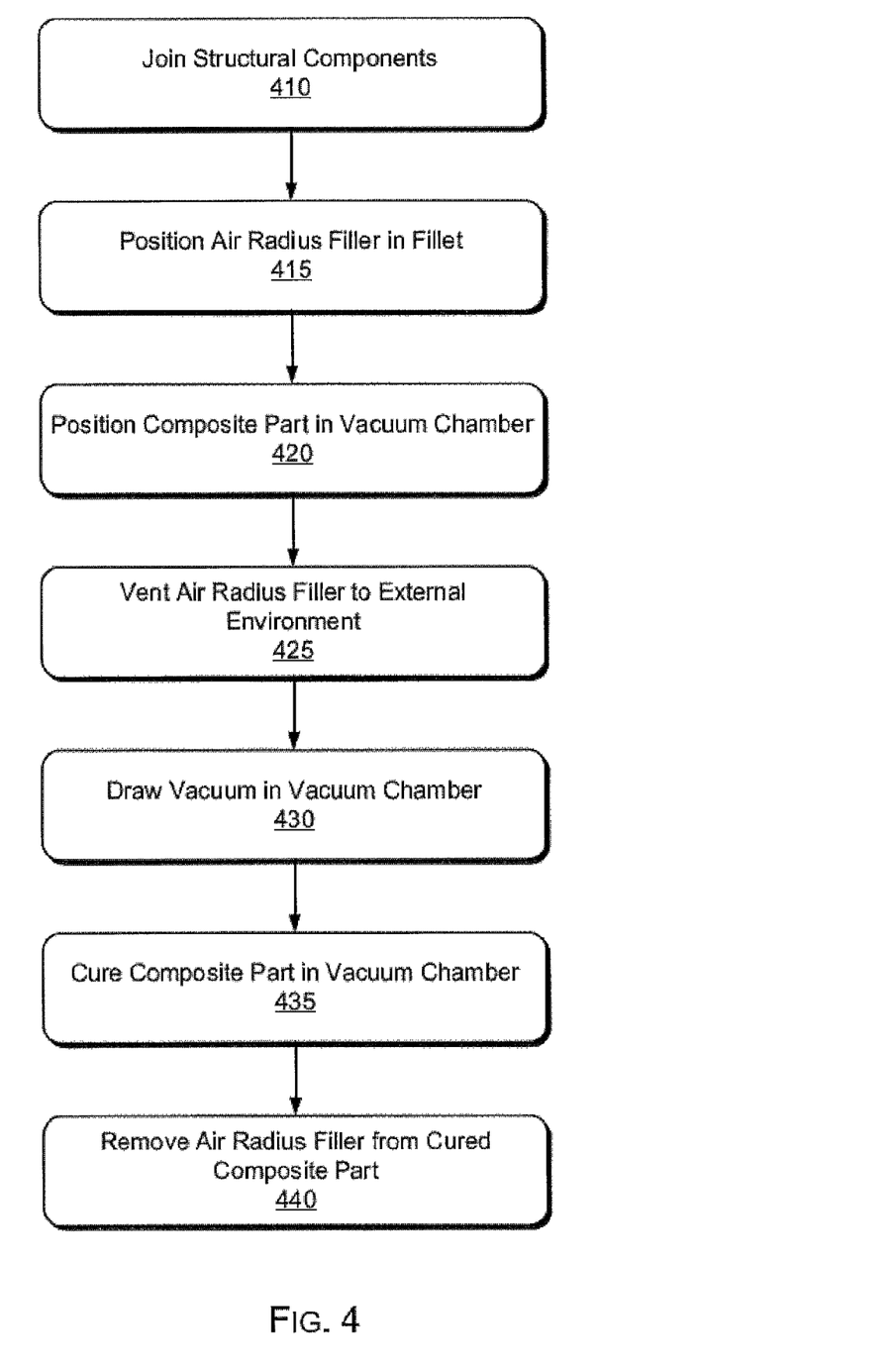
FIG. 4 is a flowchart illustrating operations in a method to install a wiring harness in a structure, according to embodiments.

FIG. 4 is a flowchart illustrating operations in a method to manufacture a composite part 300 without a radius filler, according to embodiments. Referring to FIG. 4, at operation 410 the structural components are joined to define a shape, such as the shape illustrated in FIG. 3A, such that the first structural elements 310 define beams and the second structural components define panels which are supported by the beams. In practice, a composite part 300 may comprise numerous beams. An adhesive resin may be applied to the structural elements 310, 320. Further, one or more clamps may be applied to the secure the structural elements 310, 320.

Figure 3B:
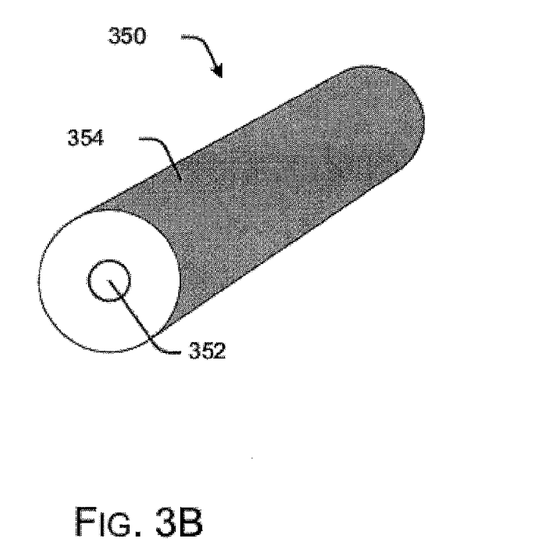
FIG. 3B is a perspective view of an air radius filler, according to embodiments.

At operation 415 an inflatable radius filler 350 is positioned in the fillet. FIG. 3B is a schematic illustration of an inflatable radius filler in accordance with embodiments. Referring to FIG. 3B, in some embodiments an inflatable radius filler 350 may comprise a vacuum bag 354 formed from a suitable polymer material such as nylon. The vacuum bag 354 may be expandable to form to the sides 332, 334, 336 of the fillets 330. The vacuum bag 354 may further comprise a vent 352 which allows the vacuum bag 354 to be vented to an external environment.

Figure 3C:
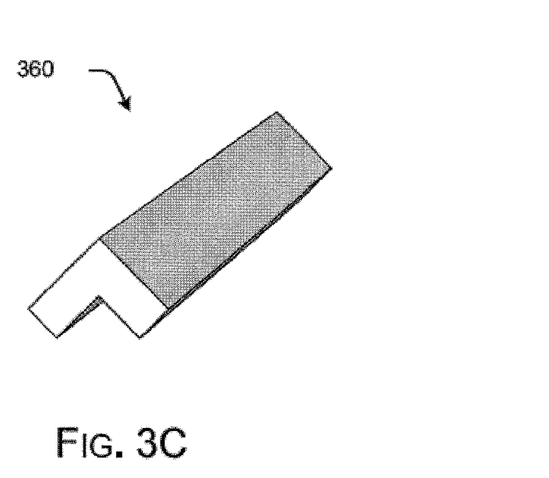
FIG. 3C is a perspective view of a bag carrier, according to embodiments.

In some embodiments at least one bag carrier may be positioned in the vacuum bag 354. One example of a bag carrier 360 is depicted in FIG. 3C. Referring to FIG. 3C, in some embodiments the bag carrier 360 may be embodied as a metal bracket having a V-shaped cross section such that the bag carrier 360 conforms to portions of at least two of the sides 332, 334 of a fillet 330. In use, the bag carrier 360 may be positioned in the vacuum bag 354. In some embodiments the bag carrier 360 may be wrapped in a fabric before it is positioned in the bag carrier in order to impart a larger radius to the corners of the fillet 330, thereby reducing the likelihood of cracking or splitting of the laminate at the corners of the fillet 330.

In alternate embodiments the inflatable radius filler 350 may be implemented as tube formed from a deformable material, e.g., a suitable polymer or rubber. The tube may be cylindrical in shape, as depicted in FIG. 3B, or may be formed such that the tube is triangular in shape to correspond to the triangular cross section of the fillets 330.

At operation 420 the composite part 300 is positioned in a vacuum chamber. By way of example, in some embodiments the vacuum chamber may be embodied as a second vacuum bag which is sufficiently large to hold the entire assembly of structural components. The vacuum chamber 300 may further comprise an autoclave which has an integrated vacuum bag.

At operation 425 the inflatable radius filler 350 is vented to an external environment. By way of example in some embodiments the vent 352 of the inflatable radius filler 350 may be placed in fluid communication with the ambient environment, e.g., by coupling a tube to the vent 352 and extending the tube to the ambient environment.

At operation 430 a vacuum is drawn in the vacuum chamber. As used herein the term vacuum should be construed to mean that the ambient pressure of the gas in the vacuum chamber is reduced to a level below the air pressure of the ambient environment. As used here, the term vacuum should not be construed to require the forming of a perfect vacuum in the vacuum chamber. A vacuum may be drawn by drawing the gas from the vacuum chamber using a pump or the like.

Because the inflatable radius filler 350 is vented to the ambient environment the inflatable radius filler 350 will maintain an internal pressure that corresponds approximately to the ambient environment. Thus, as a vacuum is drawn in the vacuum chamber the inflatable radius filler 350 will expand to occupy the space defined by the fillet(s) 330.

The expansion of the inflatable radius filler 350 in the fillet(s) 330 applies a uniform cure pressure each of the sides 332, 334, 336 of the fillet(s) 330, thereby reducing the risk of ply distortion and voids in the layers of the composite structures 310, 320.

At operation 435 the composite part 300 is cured in the vacuum chamber. In some embodiments curing the composite part 300 may comprise heating the composite part to a temperature at which the resin and/or any adhesive used to form the composite part 300 will cure. In addition, the composite part 300 may be subjected to pressure. The specific temperature and pressure applied to the composite part 300 may be a function of the materials from which the composite part is constructed. By way of example, in composite materials used in the aerospace industry are commonly heated to a temperature range between 30 degrees centigrade and 200 degrees centigrade and are subjected to pressures between 15 and 100 psi.

At operation 440 the inflatable radius filler 350 is removed from the cured composite part 300 to provide a cured composite part 300 comprising a first structural element 310 and a second element 320 formed from a composite material and joined at an intersection to define a fillet at the intersection, and an air radius in the fillet 330.

Figure 3D:
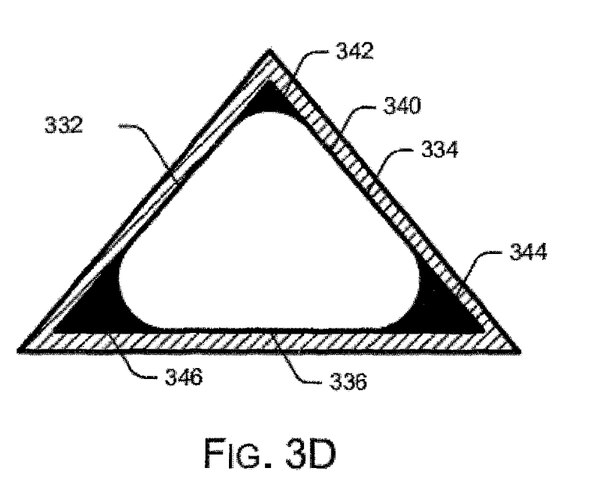
FIG. 3D is a side view of fillet, according to embodiments.

As illustrated in FIG. 3D, in some embodiments the fillet 330 may be provided with a reinforcement member 340 which binds the respective walls 332 of the fillet 330 to one another. The reinforcement member 340 may be formed from fabric material which may be impregnated with an epoxy resin such that during the curing process the fabric material cures to the walls 332 of the fillet 330. In such embodiments the reinforcement member 340 helps to absorb stress and strain on the structural components that define the fillet 330. In addition, the resin softens the inner radii of the corners 342, 344, 346 of the fillet 330. Both of these factors reduce the likelihood of cracking or splitting the composite materials at the corners 342, 344, 346 of the fillet 330.

By way of example and not limitation, in some embodiments the vacuum bag 354 may be wrapped in a composite ply material such that, when cured, the composite ply material forms the reinforcement member 340. The reinforcement member 340 may be formed from the same composite material as the structural elements 310, 320 such that the composite ply material which forms the reinforcement member 340 has an elastic modulus which is approximately the same as the elastic modulus of the structural components 310, 320. The particular number of layers of composite ply material used to wrap the vacuum bag 354 is not critical. In some embodiments the vacuum bag 354 may be wrapped with 1-5 layers of composite ply material.

Thus, described herein are methods to form a composite part which includes one or more fillets 330 that include a hollow aperture, rather than a radius filler. In some embodiments the fillet 330 may be left completely hollow. In other embodiments the fillet 330 may include a reinforcement member 340 formed from one or more layers of composite ply material. In use, the fillet 330 may be used as a conduit through which wiring, cables, fluid lines, or the like may extend. Because the fillet 330 is a confined space, there may be no need for clips or housings to hold the wires, cables, or fluid lines in place.

When used in an aircraft, the composite part 300 may define a confined space which operates in pressurized and unpressurized states at different points in time, depending upon the conditions in which the aircraft is being operated.

Figure 3E:
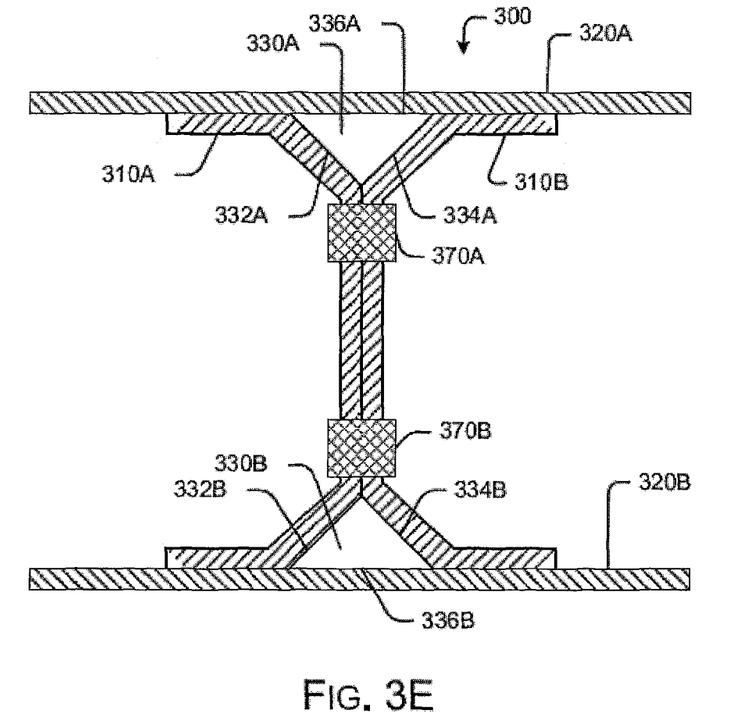
FIG. 3E is a side view of composite structure, according to embodiments.

In another example depicted in FIG. 3E reinforcement webbing 370A, 370 may be wrapped around the structural elements 310A, 310B proximate the intersection of the walls 332, 334 in order to reinforce the joint between the structural elements 310A, 310B. The reinforcement webbing 370A, 370B may be formed from the same composite material as the structural elements 310, 320 such that the composite ply material which forms the reinforcement webbing 370A, 370B has an elastic modulus which is approximately the same as the elastic modulus of the structural components 310A, 310B. The particular number of layers of composite ply material used to wrap structural components 310A, 310B is not critical. In some embodiments the vacuum bag 354 may be wrapped with 1-5 layers of composite ply material.

Figure 5:
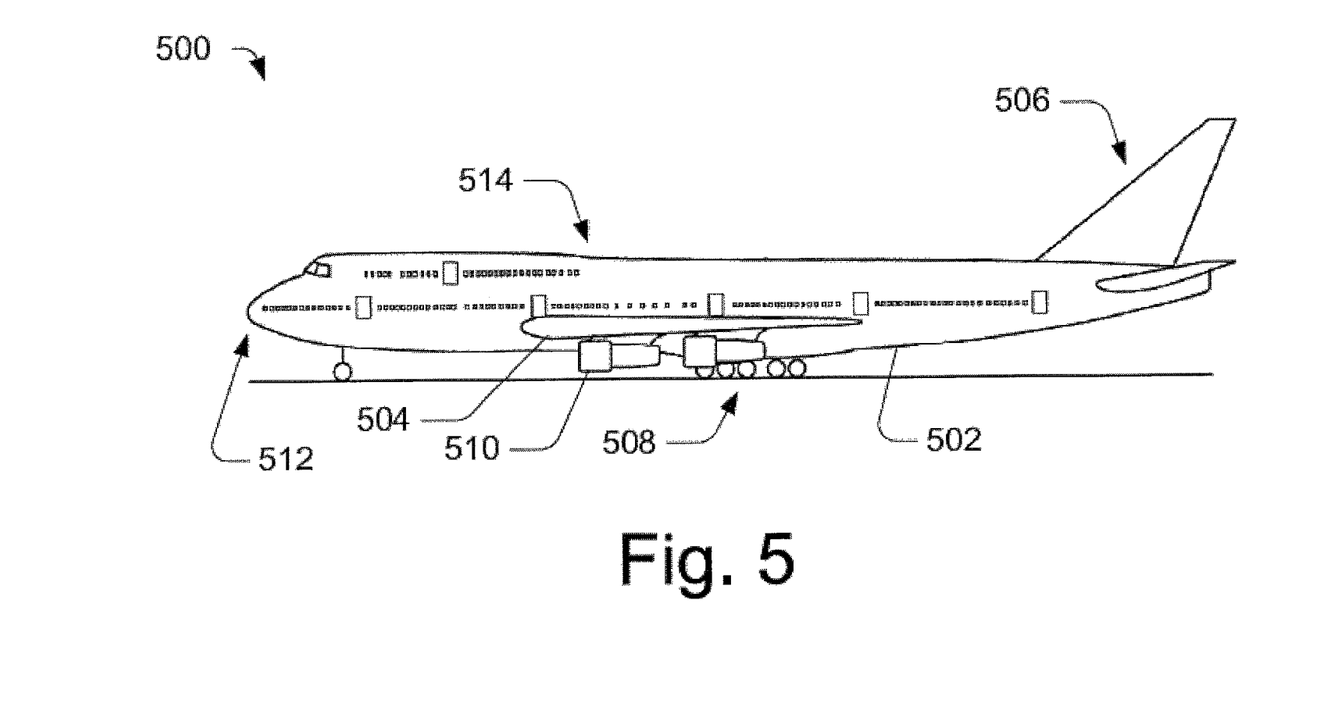
FIG. 5 is a schematic illustration of an aircraft, according to embodiments.

FIG. 5 is a side elevation view of an aircraft 500 having one or more composite parts such as composite part 300 in accordance with another embodiment of the disclosure. One may appreciate that composite parts be employed in a wide variety of locations, including the fuselage, wings, empennage, body, and walls of the aircraft 500. In alternate embodiments, composite parts may be used on other types of structures, vehicles, and platforms, such as motor vehicles, aircraft, maritime vessels, spacecraft, or other suitable applications.

In this embodiment, the aircraft 500 includes a fuselage 502 including wing assemblies 504, a tail assembly 506, and a landing assembly 508. The aircraft 500 further includes one or more propulsion units 510, a control system 512 (not visible), and a host of other systems and subsystems that enable proper operation of the aircraft 500. One should appreciate that composite part may be employed in any suitable portion of the aircraft 500, such as in a fuselage 502, wing assemblies 504, tail assembly 506, and any other suitable areas of the aircraft 500. In general, the various components and subsystems of the aircraft 500 may be of known construction and, for the sake of brevity, will not be described in detail herein.

Although the aircraft 500 shown in FIG. 5 is generally representative of a commercial passenger aircraft, including, for example, the 737, 747, 757, 767, 777, and 787 models commercially available from The Boeing Company of Chicago, Ill., the inventive apparatus and methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A composite part comprising:
   a first structural element;
   a second structural element joined at an intersection with the first structural element to form a fillet; and
   reinforcement webbing wrapped around the first structural element proximate the fillet.

2. The composite part of claim 1, wherein the first structural element and the second structural element form an I-shaped beam.

3. The composite part of claim 1, wherein the first structural element and the second structural element are cured while an inflatable radius filler is positioned at the intersection to form the fillet.

4. The composite part of claim 3, wherein the inflatable radius filler comprises a tube formed from a deformable material.

5. The composite part of claim 3, wherein the inflatable radius filler comprises a vacuum bag.

6. The composite part of claim 5, further comprising a bag carrier positioned in the vacuum bag, wherein the bag carrier is shaped to conform to at least a portion of the fillet.

7. The composite part of claim 6, further comprising a reinforcement member along a second portion of the fillet, wherein the bag carrier is wrapped in a fabric, wherein the fabric comprises a resin material such that, after curing, the fabric forms the reinforcement member.

8. The composite part of claim 1, wherein the first structural element comprises a composite material.

9. The composite part of claim 8, wherein the second structural element comprises the composite material.

10. The composite part of claim 1, wherein the first structural element and the structural second element form a T-shaped beam.

11. A composite part comprising:
    a first structural element;
    a second structural element joined at an intersection with the first structural element to define an air-filled fillet at the intersection; and
    reinforcement webbing wrapped around, proximate to the air-filled fillet, the first structural element.

12. The composite part of claim 11, wherein the air-filled fillet has a cross-sectional shape that forms a triangle.

13. The composite part of claim 11, further comprising a reinforcement member disposed in the air-filled fillet.

14. The composite part of claim 11, wherein the first structural element and the structural second element form an I-shaped beam.

15. The composite part of claim 11, wherein the first structural element comprises a composite material.

16. The composite part of claim 15, wherein the second structural element comprises the composite material.

17. The composite part of claim 11, wherein the first structural element and the second structural element form a T-shaped beam.

18. The composite part of claim 11, further comprising a third structural element.

19. The composite part of claim 11, wherein the first structural element comprises a first structural component and a second structural component, and wherein the air-filled fillet is formed at the intersection of the first structural component, the second structural component, and the second structural element.

* * * * *